Patented May 31, 1927.

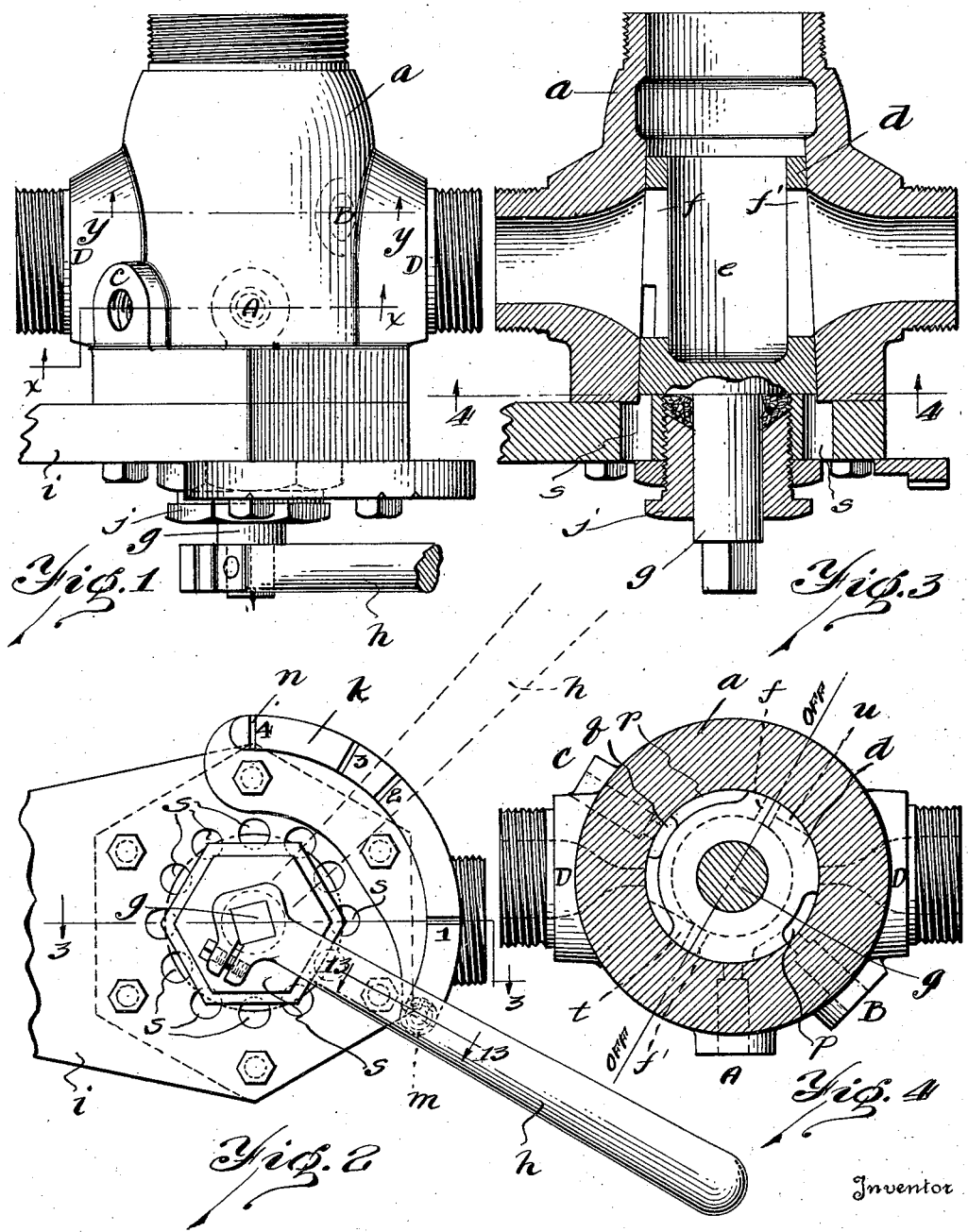

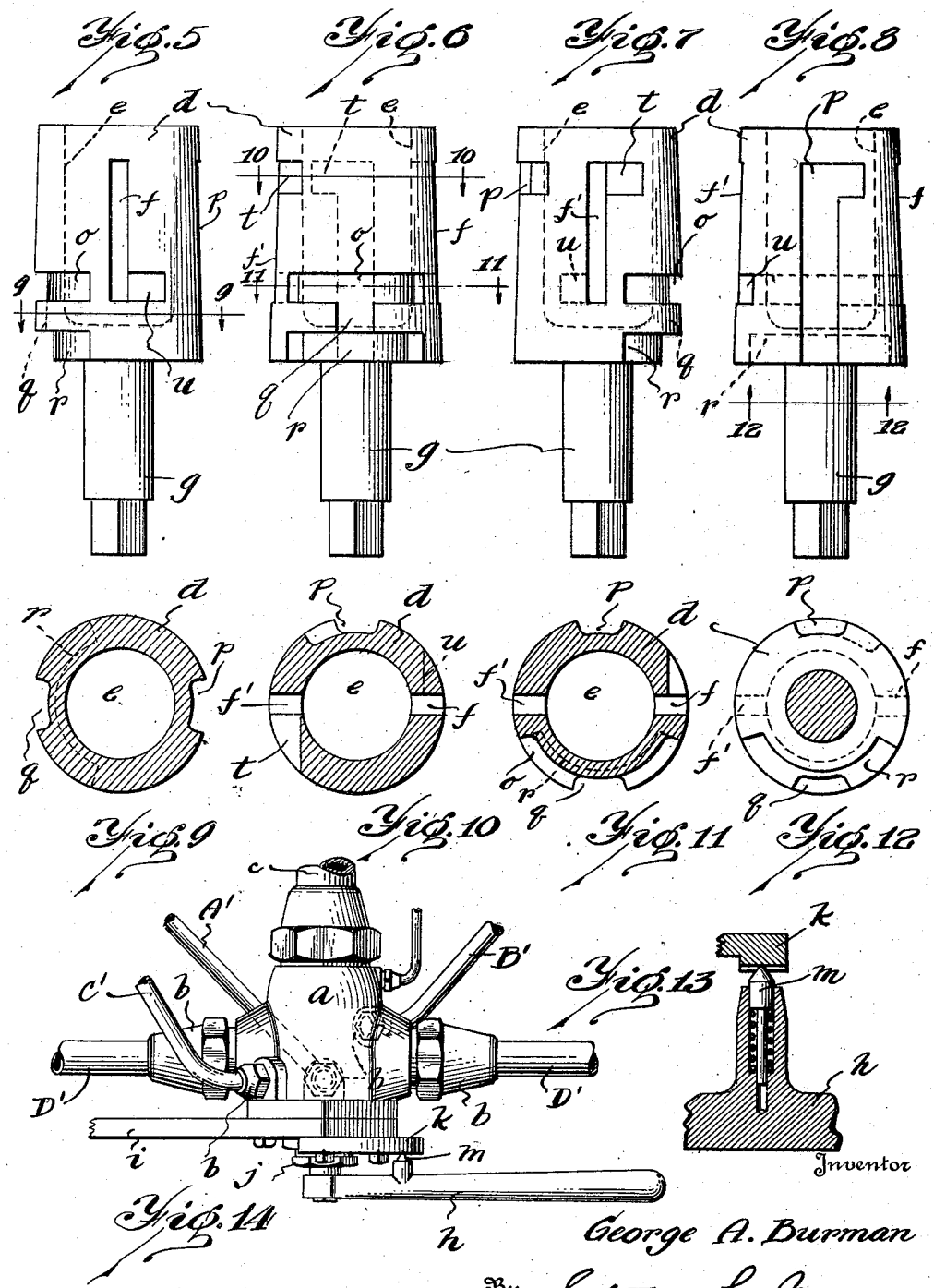

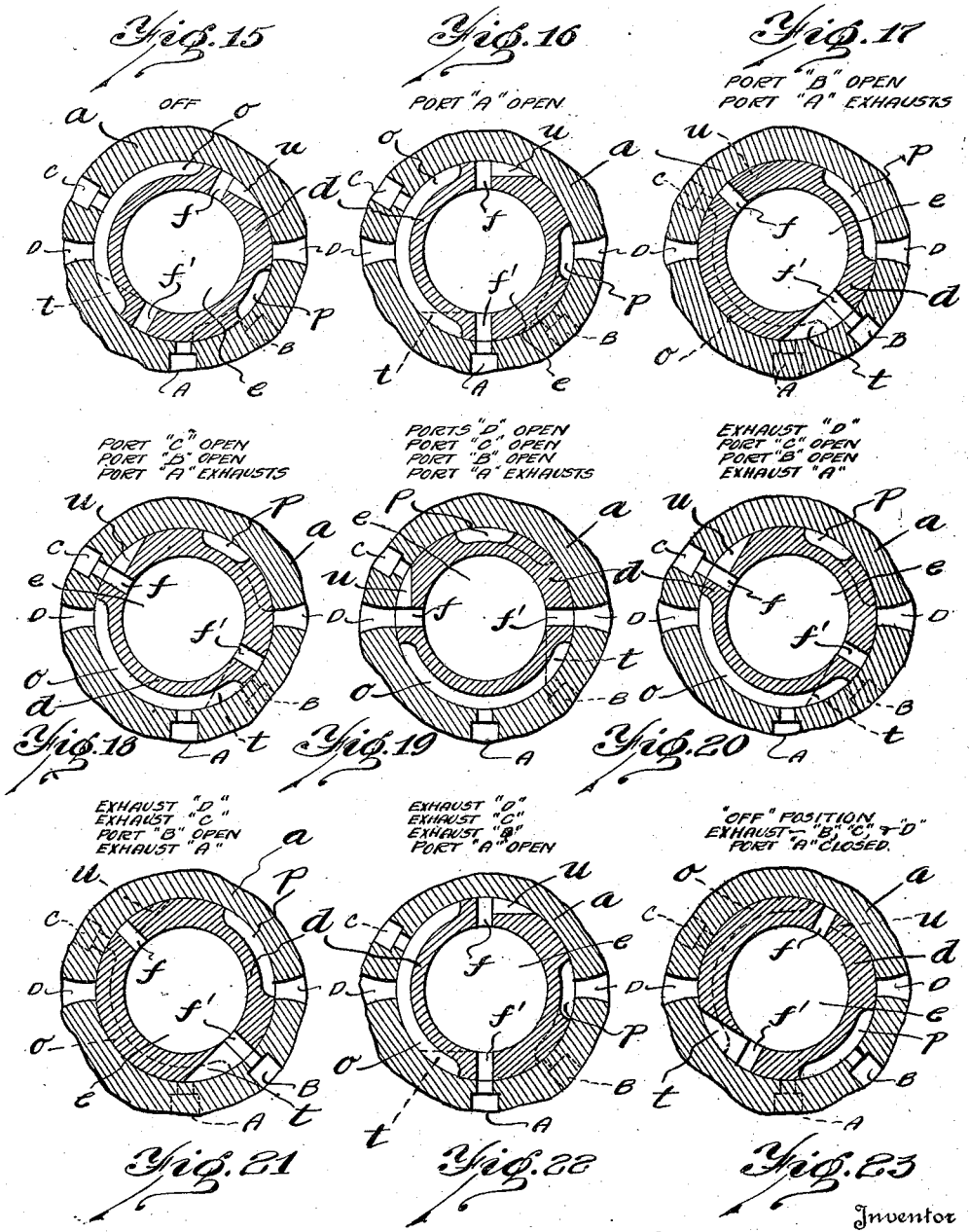

1,630,781

UNITED STATES PATENT OFFICE.

GEORGE A. BURMAN, OF DETROIT, MICHIGAN, ASSIGNOR TO E. J. WOODISON COMPANY, OF DETROIT, MICHIGAN, A CORPORATION OF MICHIGAN.

MULTIWAY VALVE.

Application filed September 28, 1923. Serial No. 665,336.

This invention relates to valves and more particularly to a multi-way port valve for controlling a plurality of machine operations.

In my co-pending application Serial No. 665,335, I have shown this form of valve as used for controlling the operation of a core making machine. Obviously this form of valve could be used for operating other machines having parts that are adapted to be automatically operated by fluid pressure.

The object of the present invention is to so control the opening and closing of the different ports that the desired combination of movements may be automatically controlled. The ports in this valve may be divided into two main groups, one in which a plurality of ports are successively opened one at a time, until all of them are in direct communication with the fluid pressure main. In exhausting this group the ports are exhausted one at a time until all of them are completely exhausted. The second group in this invention concerns the ports A and B which are alternately opened and closed. More specifically speaking, the port A is opened while port B is exhausted and port A is exhausted while port B is opened. Port B is a member of both groups as will be noticed when the operation of the valve is described in the detailed specification following. Obviously, the invention is not limited to the specific combination shown, but as occasion demands the combinations may be varied.

Another object of the invention is to so coordinate the intake passage-ways and exhaust passage-ways that the ports are successively exhausted after the intake passageways pass by the ports.

In the drawings:

Fig. 1 is a side elevation of the valve.

Fig. 2 is a bottom plan view of the same.

Fig. 3 is a vertical sectional view through the valve taken on the line 3—3 of Fig. 2.

Fig. 4 is a horizontal sectional view taken on the line 4—4 of Fig. 3.

Figs. 5 to 8 inclusive are elevational views of the conical valve.

Fig. 9 is a section on the line 9—9 of Fig. 5.

Fig. 10 is a section on the line 10—10 of Fig. 6.

Fig. 11 is a section on the line 11—11 of Fig. 6.

Fig. 12 is a section on the line 12—12 of Fig. 8.

Fig. 13 is a detail of the detent taken on the line 13—13 of Fig. 2.

Fig. 14 is an elevational view of the valve showing the conduits which lead off to the machine operating mechanism.

Figs. 15 to 23 inclusive are sectional views showing the operation of the valves; Figs. 15, 16, 18, 19, 20 and 22 taken on the line $x$—$x$ of Fig. 1 and Figs. 17, 21 and 23 taken on the line $y$—$y$ of Fig. 1.

The valve casing $a$ is provided with ports A, B C and D. To these ports are connected by suitable coupling members $b$ the conduits A′, B′ C′ D′ for connecting the working mechanism of the machine with the fluid pressure main $c$. The fluid pressure main is connected by a suitable coupling to the upper end of the valve casing, the interior of the said valve casing being cored out to receive the tapered conical valve $d$. This conical valve is provided with a hollow interior $e$ which is opened at its upper end so as to afford a communication to the fluid pressure main.

The wall of the conical valve $d$ is formed with passageways $f$ and $f'$ preferably positioned 180 degrees removed from each other. As will be noticed from Figs. 5 to 8, these passageways are merely elongated slots through the walls of the valve thus opening the interior portion $e$ of the valve to the outside. These elongated passageways $f$ and $f'$ are of such a length that they will register with all the ports in the casing some of which are positioned in different horizontal planes. The detailed operation of the valve for successively opening the different ports will be described later. The valve is provided with a stem $g$ on which is adapted to be secured a handle $h$ for operating the same. A bracket $i$ which can be secured to any permanent fixture supports the valve casing and a packing nut $j$ screws therein about the stem $g$ to prevent leakage about the joint. A segment $k$ is secured to the bracket and a detent $m$ (see Fig. 13) is carried by the handle and adapted to engage in the notches $n$ which are numbered 1, 2, 3 and 4 (see Fig. 2). As the handle is moved to operate the valve the detent will be positioned in these notches which correctly locate the passageways $f$ and $f'$ with respect to the several ports for the correct manipulation of the controlling means.

As shown in Fig. 2, the valve operating handle is located in the "off" position and the same will be moved upwardly or counter clock-wise to successively open the ports and will be moved downwardly or clock-wise to successively exhaust the ports. This operation of the valve and the cooperation of the intake passageways and exhaust passageways with the ports A, B, C, and D, may be better understood by describing the operation of the same as shown by Figs. 15 to 23 inclusive. These figures are labeled to show how the ports are successively opened and then successively exhausted, a detailed description of which is contained in the following paragraphs.

In Fig. 2 the hand operated lever is located in the "off" position thereby positioning the valve and ports as shown in Fig. 15. The passageways $f$ do not register with any one of the ports but the exhaust passage $a$ registers with port C and one of the ports D while the exhaust passage $p$ registers with the port B. By referring to Figs. 5 to 8 the connection between the exhaust passageways and the atmosphere is obvious. The exhaust passage $o$ is a groove cut into the outer wall of the valve while a connecting groove $q$ at right angles thereto connects this passageway to the groove $r$ located near the bottom of the valve. Referring to Fig. 3 it will be noticed that the support $i$ is provided with a plurality of holes $s$ which are opened to the atmosphere and to the groove $r$ in the valve. Similarly the exhaust passageway $p$ registers at all times with the holes $s$. Obviously whenever the exhaust passageways register with the ports, the air contained in the conduits leading off from said ports may be exhausted to the atmosphere.

When the operating handle is moved to the position No. 1, the valve will be positioned as in Fig. 16 with the passageway $f'$ registering with port A, while ports B, C and D are exhausting. In Fig. 17 the port B registers with the passageway $f'$ the operating handle positioned in No. 2 notch. Referring to Fig. 1 it will be noticed that port B is located in a different horizontal plane than port A. As the port B is opened to the fluid pressure main the exhaust passage $o$ registers with port A thereby exhausting the same. Now as the valve is rotated farther the handle located in notch No. 3, the valve assumes the position as shown in Fig. 18 in which the passageway $f$ registers with port C. The passageway $f'$ is provided with a laterally extending passageway $t$ (see Figs. 7 and 10) so as to allow the port B to remain connected with the interior of the valve. This condition is possible because of the fact that ports A and B are located in different horizontal planes and the lateral passageway $t$ will not connect with port A when the valve is positioned as in Fig. 17.

In Fig. 19 the operating lever is rotated to notch No. 4 which opens the ports D to the interior of the valve. It will be noticed that the passageway $f$ is provided with a laterally extending passageway $u$ (see Fig. 5 and Fig. 19) which is so arranged as to connect port C with the interior of the valve when in the position as shown in Fig. 19. It will also be noticed that the passageway $f'$ is still in communication with port B when the valve is in this position and the port A is registering with the exhaust passageway $o$.

Now on the return movement of the operating lever the valve is returned step by step through the different positions until it comes to rest in the "off" position. The first stop shows in Fig. 20 that one of the ports D is in communication with the exhaust passageway $o$ thereby exhausting the fluid pressure from the conduit D'. It is also seen that in this position the ports C and B still remain open or in communication with the fluid pressure main while port A remains exhausted. In Fig. 21 the valve is rotated until the passageway $f'$ is in communication with port B. It will thus be seen that the ports D are still exhausting and port C is now registering with the exhaust passageway $o$ while the port A is also still exhausting. In Fig. 22 the valve is rotated and the passageway $f'$ is in communication with port A but the port B is now in communication with the exhaust passageway $p$ and the ports D and C are exhausting through the exhaust passageway $o$. In Fig. 23 the valve is completely returned to the "off" position which shows ports B C and D exhausting while port A is closed neither exhausting nor receiving any fluid pressure.

It is obvious that any number of ports may be utilized in a valve of this character but I have merely shown these four ports and connecting passageways to illustrate the operation of the valve. In this valve ports A and B may be alternately actuated, that is port A will be opened while port B exhausts and vice versa, port B will be opened while port A exhausts. This will be considered as one group of instrumentalities while the second group of instrumentalities will take in ports B C and D which do not operate alternately but are opened one after the other until they all are opened and then are exhausted one by one until they are all exhausted.

In following the moving of this valve it will be seen that during the return movement of the operating handle the exhaust passageways will register with the ports after the intake passageways have passed by thus causing the exhaust to lag behind the intake. Port A of course is operated in an entirely different manner from the rest of the ports and the claims are drawn to broadly state these two groups of ports so arranged as to function with one continuous movement of the operating lever. Obviously these ports could be positioned differently, the only condition being that the ports that open alternately should be located in different horizontal planes so as not to interfere with one another since port B must function with either group or arrangement.

What I claim is:

1. A valve for controlling a plurality of machine operations having in combination, a valve body provided with ports arranged in different horizontal planes and connected with conduits leading to the machine parts, a hollow valve rotatable within the valve body having its interior connected to a fluid pressure supply, this valve body having openings extending through its walls which are of sufficient length to align with the ports in the valve body as the valve is rotated, the valve also having grooves in its exterior surface which extend to the end of the valve and communicate with the atmosphere, these grooves being adapted to align with ports in the valve body to permit exhaust thereof.

2. A valve for controlling a plurality of machine operations having in combination, a valve body provided with ports arranged in different horizontal planes and connected with conduits leading to the machine parts, a hollow valve rotatable within the body having its interior connected to the fluid pressure supply, this valve having openings extending through its walls which are of sufficient length to align with the various ports in the valve body as the valve is rotated step by step, these openings in the valve having extensions in the plane of certain ports in the valve body whereby these ports remain in communication with the fluid pressure supply during more than one step in the movement of the valve.

3. A valve for controlling a plurality of machine operations having in combination, a valve body provided with ports arranged in different planes and connected with conduits leading to the machine parts, a hollow valve rotatable within the body having its interior connected to the fluid pressure supply, this valve having openings extending through its walls which are of sufficient length to align with the various ports in the valve body as the valve is rotated step by step, these openings in the valve having extensions in the plane of certain ports in the valve body whereby these ports remain in communication with the fluid pressure supply during more than one step in the movement of the valve, the valve also having grooves in its exterior surface which extend to the end thereof and communicate with the atmosphere, these grooves being adapted to align with ports in the valve body to permit exhaust thereof.

4. A valve for controlling a plurality of machine operations having in combination, a valve body provided with ports connected with conduits leading to the machine parts, a hollow valve within this valve body with its interior connected to a fluid pressure supply and adapted to be rotated with step by step movement, the valve having openings extending through its walls, and having grooves in the exterior surface of its walls, these openings and grooves being adapted to open and exhaust the ports in the valve body respectively, the said ports, openings and grooves being arranged so that in the first step in the movement of the valve one port is open, and in the second and remaining steps, this port is exhausted and other ports are successively opened and maintained open.

In testimony whereof I affix my signature.

GEORGE A. BURMAN.